Patented Sept. 10, 1940

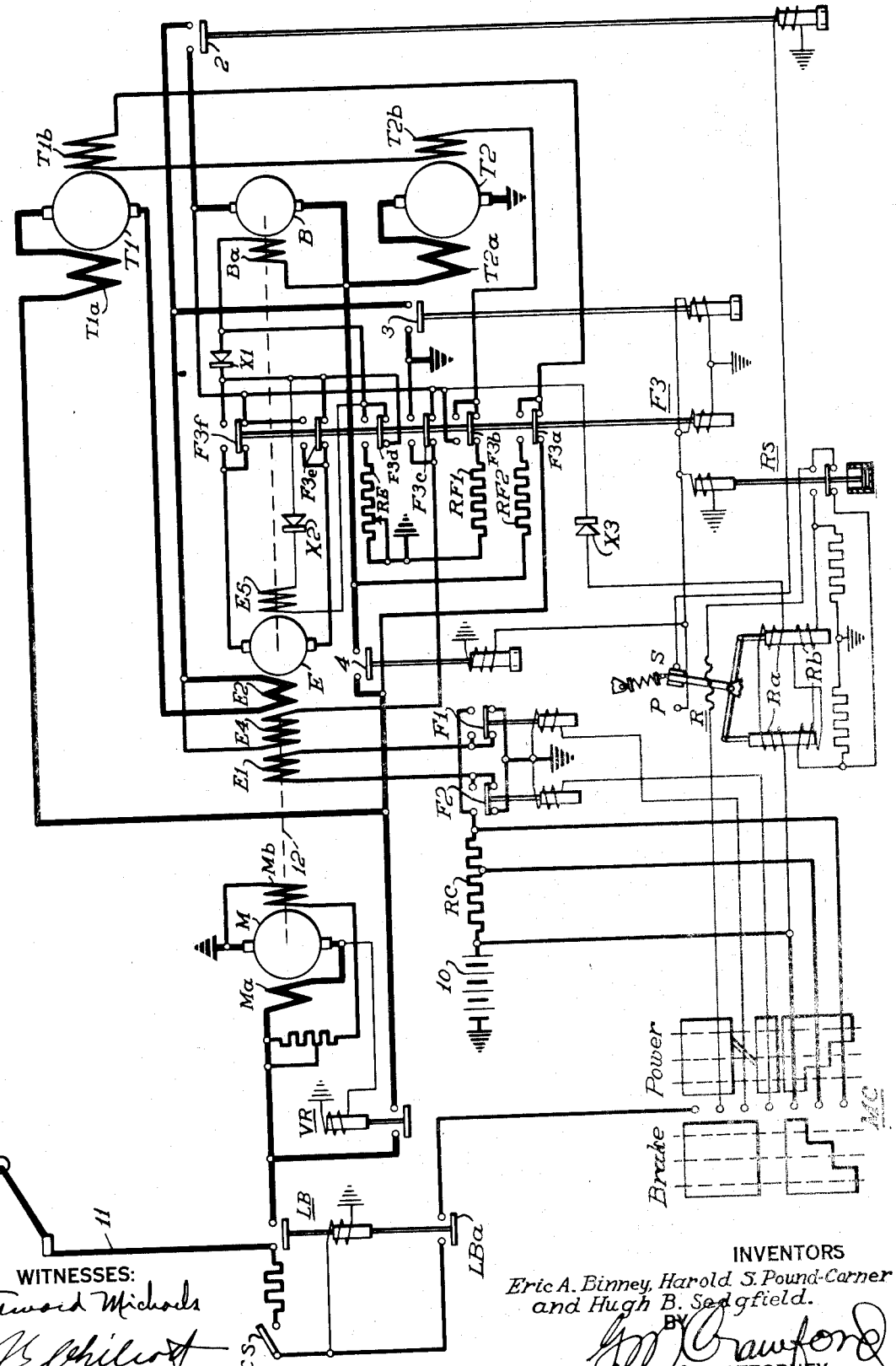

2,214,604

UNITED STATES PATENT OFFICE 2,214,604

ELECTRIC MOTOR CONTROL SYSTEM

Eric Alton Binney, Ilkley, and Harold Sinclair Pound-Corner and Hugh Brougham Sedgfield, Bradford, England, assignors to The English Electric Company Limited, London, England, a company of Great Britain Application September 7, 1939, Serial No. 293,684 In Great Britain September 8, 1938

10 Claims. (Cl. 172—179)

This invention relates generally to electric motor control systems and, more particularly, to systems for controlling the acceleration and deceleration of electric traction motors of the direct current type.

In our copending application Serial No. 293,685, filed September 7, 1939, a buck and boost system for the control of electric motors is described, with means for transferring the load formed by the motors wholly to the external direct current supply when the motors are up to full voltage. The booster may then be left running light or it may continue to be utilized to supply excitation current for the motors. The booster is so excited that it tends to maintain in its armature circuit and hence in the motor circuit, a predetermined current which may be substantially constant or vary according to some predetermined law. After transference of the load to the external supply, the booster may still tend to control the motor armature current by the action on the motor excitation.

In the foregoing copending application, there is also described the combination with the above-mentioned type of system of means, such as an auxiliary machine mechanically coupled to the motors, for varying motor excitation inversely as motor speed and these means may act on the excitation of the booster. Thus in one particular arrangement described, the booster, after the load formed by the motor armatures has been transferred therefrom wholly to the external supply, continues to be utilized to supply separately excited field windings on the motors and booster excitation is controlled partly in accordance with motor current and partly in accordance with motor speed, whereby the motors are given a characteristic approximating to some desired extent to a series characteristic. The arrangement is particularly useful as applied to electric traction motors, the separately excited field windings being necessary if the motors are to be braked regeneratively.

One object of the present invention is to obtain the desired characteristic of the motors after transference to the external supply and although it may be used in conjunction with the auxiliary motor-driven or axle-driven machine, according to the foregoing application, it is primarily intended as a substitute for that arrangement.

Other objects of the invention will be explained fully hereinafter or will be apparent to those skilled in the art.

According to the present invention, the traction motor or motors have series field windings and windings which can be shunt or separately excited. When the load formed by the motor armatures is transferred wholly to the external supply, the booster supplies these latter field windings and is controlled in accordance with motor current so as to maintain some predetermined current up to a particular point beyond which the booster maintains a constant current through these field windings which is preferably small and may even be zero, whereby the characteristic after this point is substantially or approaches as near as desired, to a series characteristic.

For a fuller understanding of the invention, reference may be had to the foregoing description, taken in conjunction with the accompanying drawing, in which the single figure is a diagrammatic view of a motor control system embodying the invention.

In the illustrated method of practicing the invention, as applied to buck-and-boost control, of two compound-wound direct current traction motors T1 and T2 or two groups of such motors having series field windings T1a and T2a and separately excited field windings T1b and T2b. The motors are first connected in series with each other and with a booster B between a supply conductor 11 and ground. The motors are then connected in parallel with each other and with the booster for transference of armature across the supply for transference of the load. One end of the booster is then disconnected from the supply and the motor shunt field windings T1b and T2b are disconnected from the power supply and reconnected to the booster.

The booster B is shunt wound and has in series with its shunt field winding Ba the armature of an exciter E. The exciter E is provided with a plurality of field windings E1, E2, E4 and E5. The field winding E2 carries the traction motor armature current or a shunted part thereof and the winding E1, which serves as a regulating winding, is connected to an auxiliary supply, such as a battery 10, through a variable resistor RC by means of reversing switches F1 and F2. The function of the exciter field windings E4 and E5 will be explained more fully hereinafter.

So long as the traction motor current remains at one particular value, the two field windings E1 and E2, which are acting in opposition, cancel out and produce substantially no exciter electromotive force. As the traction motors accelerate, any decrease in traction motor armature current will cause the exciter to generate a voltage therewill cause the booster electromotive force which, by varying the booster field winding to in turn reacts on the booster field winding to continue the change of excitation. Furthermore, this change of booster E. M. F. weakens the motor shunt fields in such manner as to tend to compensate for the change in traction motor armature current, so tending to maintain the latter constant.

According to the present invention, this action is allowed to go on up to a certain point at which the armature exciter armature current would reverse direction. However, a rectifying valve X1 prevents such reversal and thereafter the booster E. M. F. remains substantially constant and the excitation of the shunt fields T1b and T2b is accordingly constant and may be zero, while any change of excitation of the traction motors will be brought about solely by the series field winding T1a and T2a.

In one particular arrangement, one pole of the traction motor supply is grounded. One side of the booster is left connected to the positive pole of the supply but the other end is disconnected from ground. This end of the booster is connected to the exciter E through reversing switches F3e and F3f and then to the rectifier X1, the circuit being completed from there through the booster shunt field winding Ba to the other terminal of the booster. A somewhat high adjustable resistance RE is connected between the negative end of the booster field winding and ground. The booster excitation current is thus made up of two components, one of which flows from the positive supply conductor 11 through the field winding Ba and the said high resistance to ground and is adjustable by altering the resistance, while the other is a variable current circulating in a closed circuit formed by the booster armature, booster field winding, exciter and rectifying valve.

Up to a point the exciter will vary one of these components in accordance with any deviation of traction motor armature current from a predetermined value and the booster will accordingly vary the shunt excitation of the motors in an effort tending to maintain substantially constant current. This action continues until the exciter tends to reverse the current through the valve X1. Any appreciable reverse current through the exciter armature is, however, prevented by the rectifier valve and thereafter the current through the booster field is maintained at the constant low value comprising the component flowing from the positive pole of the supply through the field winding and resistance to ground. The booster then maintains a substantially constant, but low, shunt excitation of the motors which accordingly have a characteristic which is either a compound or a substantially series characteristic.

A further feature of the invention is the provision of an extra field winding E5 on the exciter connected directly in shunt to the said rectifying valve X1. When the exciter is supplying current in the direction in which the valve is conductive, the exciter field winding E5 is substantially short circuited and is, therefore, ineffective. When the current through the exciter tends to reverse the current which cannot pass through the rectifier X1 passes, however, through the high resistance of the field winding E5 on the exciter whereby the latter is weakened, but continues to influence the booster field current. For many purposes this gives a more desirable traction motor characteristic. Moreover, since the exciter is not substantially open circuited as it would be if only the rectifier X1 were connected across it, the risk of a dangerously high voltage being generated by the exciter and across the rectifying valve is substantially eliminated.

Since the resistance of the said rectifying valve X1 is appreciable in its conducting direction, the additional field E5 on the exciter is never in fact entirely short circuited and there is consequently a risk of an appreciable, though small, current passing through it in the reverse direction. This is particularly likely to occur immediately after the transference of the load formed by the traction motor armatures to the external supply when the current through the booster field winding and hence through the rectifying valve is at a maximum. To present this reversal of the current through the additional field winding E5 on the exciter, a further rectifying valve X2 may be connected in series with this winding.

In a further modification, the additional field winding E5 and rectifier X2 may be omitted and replaced by a high resistance. This resistance allows a certain amount of current to pass through the exciter armature in the reverse direction, which current influences the booster field winding and tends to produce a characteristic somewhat as desired. The rectifying valve X1 must, however, be designed to withstand a high voltage across its terminals in the non-conducting direction.

As shown, the booster B and the exciter E are connected to a common shaft 12 which is driven by a compound motor M having a series field winding Ma and a shunt field winding Mb. The motor M may be connected to the supply conductor 11 by a line breaker LB. A series switch 2 is provided for connecting the motors T1 and T2 across the power supply in series with the booster B. Parallel switches 3 and 4 are provided for connecting the motors T1 and T2 across the power supply in parallel-circuit relation. A master controller MC is provided for determining whether power is supplied to the motors to accelerate the vehicle or whether the motors are to be utilized for decelerating the vehicle by regenerative braking. The controller MC is also utilized to vary the resistor RC and hence the current in the field winding E1, thereby governing the motor current, as will be explained more fully hereinafter.

As described in the aforesaid copending application, a relay R is provided for automatically changing the traction motor connections from series to parallel and vice versa under predetermined conditions. The relay R, therefore, automatically governs the operation of the switches 2, 3 and 4 as well as a switch F3 which changes the field connections for the traction motors and reverses the exciter armature connections when the change-over from series to parallel operation is made. An auxiliary reversing switch RS is also controlled by the relay R to reverse the connections for a polarizing winding Rb on the relay R. This relay is provided with an operating winding Ra which is connected to one terminal of the booster B in series with a rectifier X3, as will be more fully described hereinafter.

In order that the functioning of the foregoing apparatus may be more clearly understood, the operation of the system will now be described in more detail. Assuming that the vehicle is at rest, with none of the apparatus rotating, the MB set may be started by closing a control switch CS to energize the line breaker LB, thereby connecting the motor M to the power supply. When the motor M has attained a predetermined speed a relay VR, which is connected across the armature of the motor M and is, therefore, responsive to the counter-electromotive force of the motor, is closed to connect one terminal of the motor T1 to the power conductor 11. Power is also supplied to the master controller MC by the closing of contact members LBa on the switch LB.

When the MB set is running and the train is at rest, the coil of the switch F3 is deenergized and, therefore, the various switches actuated by this coil are in the position shown, which gives the following conditions: (a) the traction motor shunt fields T1b and T2b are connected across the power supply through the switches F3a and F3b and a resistor RF1, (b) the rectifiers X1, X2 and the field winding E5 are short circuited by the switch F3d, (c) the exciter field winding E4 is connected across the contactor 2 by the switch F3c, (d) the switches F3e and F3f for reversing the exciter armature connections are in their lowermost positions, as shown.

At this point, therefore, the MB is set is running light at full speed on full line volts. The F3 coil is deenergized, therefore all the F3 switches are set for the "booster in series" condition. Since the contactor No. 2 is open and the exciter field E4 is across the contacts of No. 2, the booster voltage will be maintained at the correct value to give zero volts across the No. 1 contactor, that is, the booster volts will equal the line volts and oppose it.

When the operator moves the master controller MC to the desired power notch, the actuating coil of the contactor 2 is energized since the relay R is in the series position. At the same time, the desired amount of resistance is cut out of the resistor RC to give the correct current in exciter field winding E1 which, in turn, determines the current that will flow in the exciter field E2 and therefore, in the traction motors. The contactor 2 is closed and the traction motors, therefore, begin to take constant current under full shunt field and the train begins to move. The train is accelerated at a constant current as determined by the position of the master controller.

During this process, the booster's bucking voltage will fall until it becomes zero and will then build up in a boosting direction until the bottom brush of the booster is equal to line potential and the top one is at ground potential. At this point, the coil Ra of the relay R will receive an impulse of current which will throw it over to the parallel position.

As described in the foregoing copending application, the coil Ra is connected between the positive terminal of the battery 10 and ground in series with the rectifier X3, the booster B and the motor T2, one terminal of which is connected to ground. Therefore, when the top terminal of the booster to which the coil Ra is connected is reduced to ground potential, the rectifier X3 permits current to flow through the coil Ra in a direction to operate the relay R. Current is prevented from flowing in the opposite direction by the rectifier X3.

Upon the operation of the relay R, the reversing switch RS reverses the direction of current flow in the polarizing winding Rb, thereby preparing the relay for another operation when current is again permitted to flow through the coil Ra. However, the operation of the reversing switch RS is delayed for a slight time interval to prevent the re-operation of the relay as a result of transient conditions encountered during the switching operations.

It will be noted that the operation of the relay R from the series to the parallel position energizes the actuating coils of the switches 3, 4 and F3 and deenergizes the switch 2. The traction motor armatures will now, therefore, be connected in parallel across the line and the booster free of the traction motor load. In order to prevent the opening of the switch 2 before the switches 3 and 4 are closed, the solenoids which operate these switches are of a retarded type which prevent the decay of the magnetic flux for a short time interval after the actuating coil is deenergized. In this manner, the switches 3 and 4 are also prevented from opening until the switch 2 is closed when the motor connections are changed from parallel to series.

At this time, the switch F3 is now energized and the contact members of this switch are thrown over to the parallel position resulting in the following conditions: (a) The traction motor fields T1b and T2b are transferred to the booster with a resistor RF2 in the field winding circuit; (b) the exciter armature is reversed; (c) the connection between the rectifier X1 and the booster field is connected to the resistor RE; and (d) the exciter field E4 is now connected across contactor No. 3.

Constant current will, therefore, still be maintained in the traction motors by a steady reduction of booster volts—and therefore in the traction motor shunt fields—until a point is reached at which the exciter E tends to reverse and the rectifier X1 refused to pass current and, therefore, the current passing through the exciter armature has to pass through the rectifier X2 and the field E5, thereby providing the desired motor characteristic, as explained hereinbefore.

At any point in the foregoing process, the operator is free to move the master controller handle to any desired power notch, thereby varying the amount of current in the traction motors. The only alteration affected thereby is to vary the amount of resistance in series with the regulating field E1 which, in turn, varies the traction motor current since the exciter always tends to balance the current in the winding E2 against the current in the winding E1.

Similarly, the operator is free at any point to move the controller handle to a braking position, which simply means that he is setting the control for a negative current in the traction motors. The only alteration made on passing to a brake position is to operate the reversing switches F1 and F2 to reverse the direction of current in the regulating winding E1. In order to give the balance which is a fundamental principle of the system, the current in the series field winding E2 of the exciter must also then reverse thus giving regenerative braking.

At any instant the operator can move the master controller handle to the off position, irrespective of whether it was in a power or a brake position or whether the motors were in parallel across the lines or in series with the booster. The only effect of moving to the off position is to open the contactors 2, 3 and 4, thus opening the power circuit.

At the same time, the switches F1 and F2 have both been deenergizd so that the field winding E1 on the exciter carries no current. Under these conditions, the winding E2 carries no current and, therefore, E4 will endeavor to maintain no volts across contactor No. 2 or contactor No. 3, whichever is appropriate to the train speed at that particular moment. In the same way, an immediate return at any instant can be made either to a power or brake notch, as desired.

From the foregoing description, it is apparent that we have provided a satisfactory means for the complete automatic control of compound wound traction motors, both on power and regeneration. Furthermore, it is apparent that the machines utilized in the control system may be of a standard design, thereby making it unnecessary to provide special machines for accelerating a train or vehicle at a constant current.

Since many modifications may be made in the apparatus and arrangement of parts without departing from the spirit of the invention, we do not wish to be limited other than by the scope of the appended claims.

We claim as our invention:

1. In a motor control system, in combination, a direct-current motor, an external power supply, a booster set disposed to draw electrical energy from the external power supply and to buck or boost the supply to the motor, means for transferring the load formed by the motor armature wholly to said power supply, said motor having a field winding connected across the booster after said transfer, and said booster having a field winding connected across the external power supply after said transfer.

2. In a motor control system, in combination, a direct current motor, an external power supply, a booster set disposed to draw electrical energy from the external power supply and to buck or boost the supply to the motor, means for transferring the load formed by the motor armature wholly to said power supply, said motor having a field winding connected across the booster after said transfer, said booster having a field winding connected across the external power supply after said transfer, and a high resistance connected in said booster field winding circuit to limit the current in said circuit to a relatively low value.

3. In a motor control system, in combination, a direct current motor, an external power supply, a booster disposed to buck or boost the supply to the motor to maintain substantially a predetermined current through the motor armature, means for transferring the load formed by the motor armature wholly to said power supply, said motor having a field winding connected across the booster after said transfer, a field winding on the booster, an exciter for the booster, and means for connecting said booster field winding across the booster armature in series with said exciter.

4. In a motor control system, in combination, a direct current motor, an external power supply, a booster disposed to buck or boost the supply to the motor to maintain substantially a predetermined current through the motor armature, means for transferring the load formed by the motor armature wholly to said power supply, said motor having a field winding connected across the booster after said transfer, a field winding on the booster, an exciter for the booster, means for connecting said booster field winding across the booster armature in series with said exciter, and means for reversing the exciter armature connections when said transfer is made.

5. In a motor control system, in combination, a direct current motor, an external power supply, a booster disposed to buck or boost the supply to the motor to maintain substantially a predetermined current through the motor armature, means for transferring the load formed by the motor armature wholly to said power supply, said motor having a field winding connected across the booster after said transfer, a field winding on the booster, an exciter for the booster, means for connecting said booster field winding across the booster armature in series with said exciter, and means disposed in the exciter armature circuit for limiting the current flow to one direction.

6. In a motor control system, in combination, a direct current motor, an external power supply, a booster disposed to buck or boost the supply to the motor to maintain substantially a predetermined current through the motor armature, means for transferring the load formed by the motor armature wholly to said power supply, said motor having a field winding connected across the booster after said transfer, a field winding on the booster, an exciter for the booster, means for connecting said booster field winding across the booster armature in series with said exciter, means for reversing the exciter armature connections when said transfer is made, and a rectifying valve disposed in the exciter armature circuit for limiting the current flow to one direction.

7. In a motor control system, in combination, a direct current motor, an external power supply, a booster disposed to buck or boost the supply to the motor to maintain substantially a predetermined current through the motor armature, means for transferring the load formed by the motor armature wholly to said power supply, said motor having a field winding connected across the booster after said transfer, a field winding on the booster, an exciter for the booster, said booster field winding being connected both to the external power supply and across the booster armature in series with the exciter after said transfer.

8. In a motor control system, in combination, a direct current motor, an external power supply, a booster disposed to buck or boost the supply to the motor to maintain substantially a predetermined current through the motor armature, means for transferring the load formed by the motor armature wholly to said power supply, said motor having a field winding connected across the booster after said transfer, said booster field winding being connected both to the external power supply and across the booster armature in series with the exciter after said transfer, and means for reversing the exciter armature connections when said transfer is made.

9. In a motor control system, in combination, a direct current motor, an external power supply, a booster disposed to buck or boost the supply to the motor to maintain substantially a predetermined current through the motor armature, means for transferring the load formed by the motor armature wholly to said power supply, said motor having a field winding connected across the booster after said transfer, said booster field winding being connected both to the external power supply and across the booster armature in series with the exciter after said transfer, means for reversing the exciter armature connections when said transfer is made, and a rectifying valve disposed in the exciter armature circuit for limiting the current flow to one direction.

10. In a motor control system, in combination, a direct current motor, an external power supply, a booster disposed to buck or boost the supply to the motor to maintain substantially a predetermined current through the motor armature, means for transferring the load formed by the motor armature wholly to said power supply, said motor having a field winding connected across the booster after said transfer, said booster field winding being connected both to the external power supply and across the booster armature in series with the exciter after said transfer, means for reversing the exciter armature connections when said transfer is made, a rectifying valve disposed in the exciter armature circuit for limiting the current flow to one direction, a field winding on the exciter disposed to shunt said rectifying valve, and an additional rectifying valve connected in series with said exciter field winding.

ERIC ALTON BINNEY.
HAROLD SINCLAIR POUND-CORNER.
HUGH BROUGHAM SEDGFIELD.